United States Patent [19]

Rose et al.

[11] Patent Number: 5,524,925
[45] Date of Patent: Jun. 11, 1996

[54] REGULATION OF PRESSURE IN AUTOMOTIVE AIRBAGS

[75] Inventors: Larry D. Rose, Layton; Daniel L. Steimke, Ogden; John C. Newkirk, Layton, all of Utah

[73] Assignee: Morton International, Inc., Chicago, Ill.

[21] Appl. No.: 519,865

[22] Filed: Aug. 25, 1995

[51] Int. Cl.[6] .................................................. B60R 21/30
[52] U.S. Cl. ............................................................. 280/739
[58] Field of Search ..................................... 280/739, 738, 280/728.1, 736, 737

[56] References Cited

U.S. PATENT DOCUMENTS

| | | | |
|---|---|---|---|
| 4,380,346 | 4/1983 | Davis et al. | 280/736 |
| 4,902,036 | 2/1990 | Zander et al. | 280/736 |
| 5,346,251 | 9/1994 | Burnard et al. | 280/737 |
| 5,388,860 | 2/1995 | Brede et al. | 280/736 |
| 5,437,473 | 8/1995 | Henseler | 280/738 |

FOREIGN PATENT DOCUMENTS 4-353051  12/1992  Japan ......................... 280/739

*Primary Examiner*—Eric D. Culbreth
*Attorney, Agent, or Firm*—Lawrence I. Field; Gerald K. White

[57] ABSTRACT

A valve is provided in an automotive airbag module housing to relieve any excessive pressure in the module housing as may occur during deployment of an airbag. The valve is formed entirely from material in the housing by punching out openings in the housing material. The invention is applicable to airbag inflating devices in which the inflator is enclosed entirely within the module housing and is particularly useful in passenger side airbag inflation devices.

4 Claims, 2 Drawing Sheets

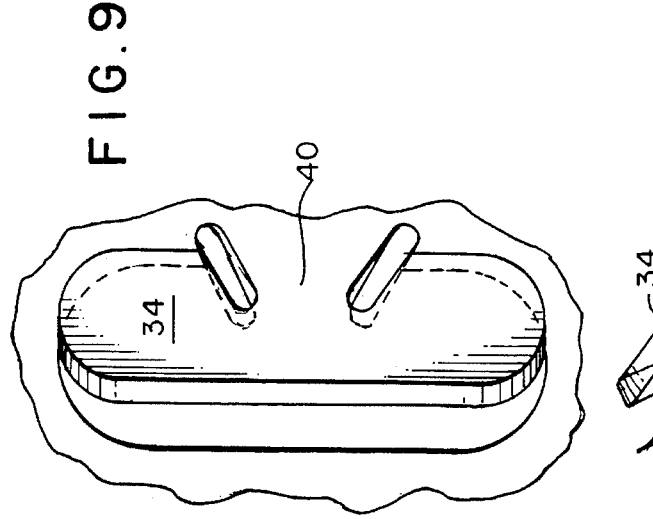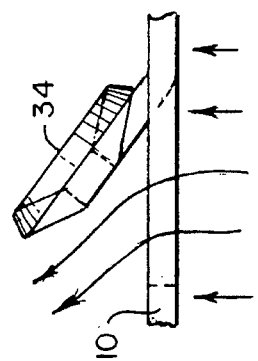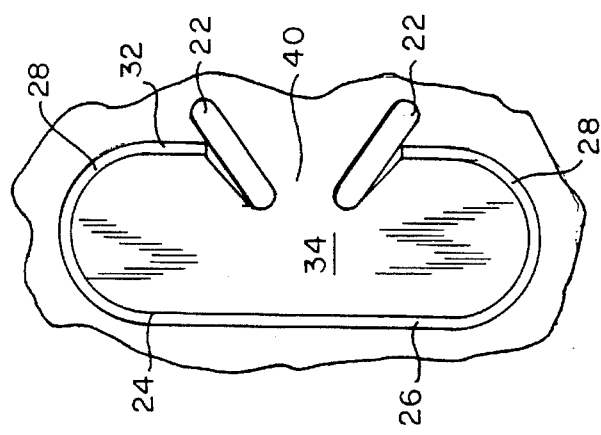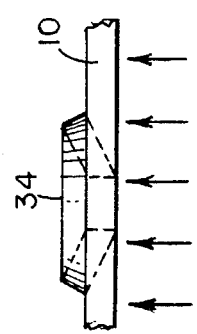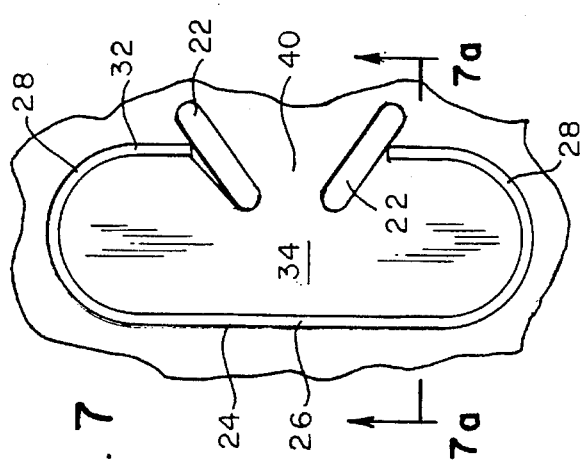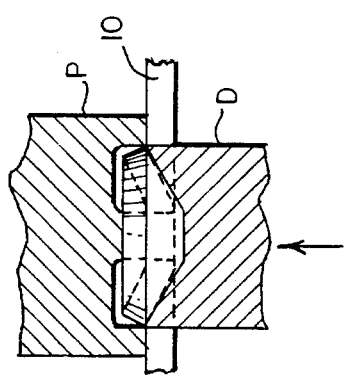

5,524,925

REGULATION OF PRESSURE IN AUTOMOTIVE AIRBAGS

This invention relates to the regulation of pressure in automotive airbags. More particularly, it relates to a pressure regulating system built into an airbag module housing wall.

BACKGROUND OF THE INVENTION

Typical automotive passenger airbag systems consist of a gas generator, cushion and housing. Most systems use a cylindrical pyrotechnic type gas generator. As described in Davis et al., U.S. Pat. No. 4,380,346 issued Apr. 19, 1983, one of the characteristics of a pyrotechnic gas generator is that as the environmental temperature increases, the rate of gas generation also increases. This change in burn rate causes a corresponding change in cushion deployment performance. During a hot temperature deployment, the cushion fills faster and more aggressively than during a cold or ambient (normal) temperature deployment. Since most crash induced deployments occur around the normal range, this creates a need for a low cost method to reduce the stress levels on the cushion and housing when a hot temperature employment occurs. To compensate for this, Davis et al. provide perforations in the inflator housing and foil covers for the holes designed to rupture at desired pressures. Because the inflator is housed in the module housing, the pressure relief is only temporary and the pressure continues to build up in the module housing and in the airbag cushion.

In another recent patent, Zander et al. U.S. Pat. No. 4,902,036, issued Feb. 20, 1995, a weld provided in the inflator housing ruptures when the generator over-pressures, thereby relieving the pressure buildup in the inflator.

In still another recent U.S. patent, Burnard et al. U.S. Pat. No. 5,346,251 a groove is provided in an inflator housing for the same purpose.

Neither of these two latter provisions is entirely satisfactory because when the inflator housing ruptures, fragments of metal can be ejected into the interior of the vehicle thereby endangering the occupant of the vehicle. Furthermore, both Zander and Burnard describe driver side airbag devices in which the rupturable structure is not enclosed in a module housing.

The present invention provides a simpler low cost means for regulating pressure in a passenger side airbag inflation module when automotive airbags are deployed. In the present invention, a valve in the module housing opens when the pressure inside the module reaches a selected value, and there is no danger of metal fragments being ejected into the vehicle.

OBJECTS OF THE INVENTION

One object of the invention is to provide a pressure regulating system built into an airbag module housing wall.

Another object of the invention is to provide novel means for regulating the pressure in an airbag, said means being formed directly in the housing wall of an airbag inflation module.

Still another object is to provide a pressure regulating system which operates whatever the ambient conditions to regulate the pressure in an airbag during deployment of the airbag.

Another object of the invention is to provide means which prevent overpressurization of the airbag whatever the ambient conditions are when the airbag is deployed.

Still another object of the invention is to provide valve means in an airbag inflator module housing which avoids the ejection of metallic particles or pieces into the interior of a passenger carrying automotive vehicle when an airbag is inflated.

DESCRIPTION OF THE DRAWINGS

These and other objects will be pointed out, or will become apparent from the description which follows taken in conjunction with the drawings in which

FIGS. 7 and 7a are views showing the manufacture of the valve of FIGS. 1 and 2;

FIGS. 8 and 8a are views of the valve of FIGS. 1 and 2 before deployment of an airbag;

and FIGS. 9 and 9a are views showing the valve of FIGS. 1 and 2 after it opens.

Figure 1:
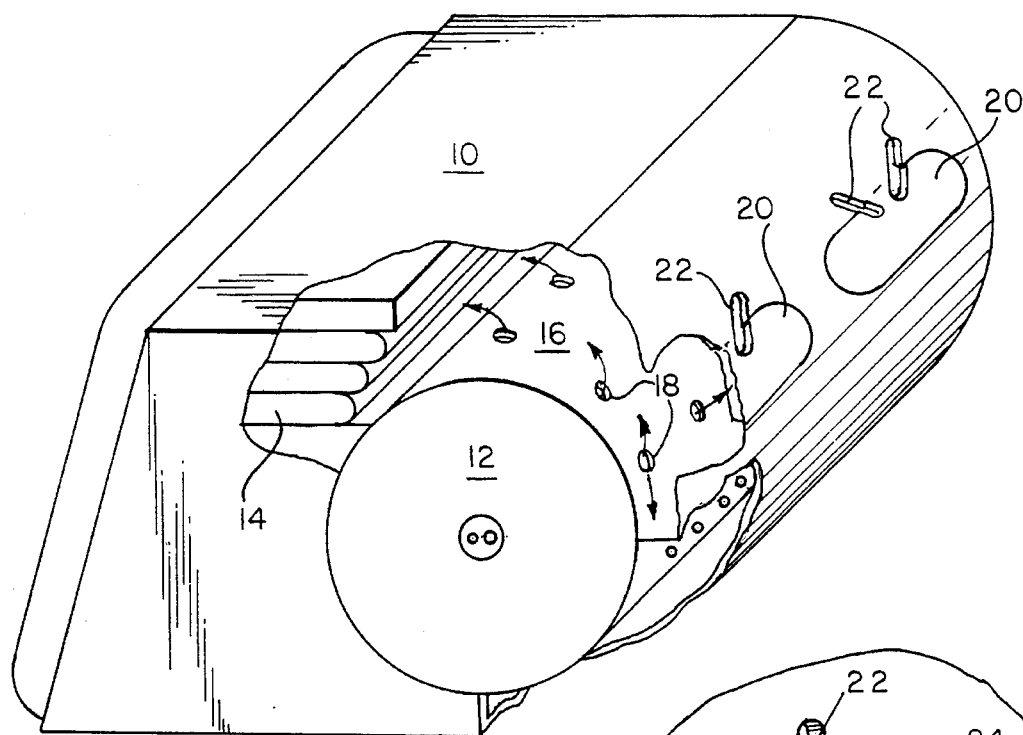
FIG. 1 is a view in perspective of a passenger side airbag module, partly broken away.

A typical automotive passenger airbag system is shown in FIG. 1 and comprises a module housing 10 within which an inflator 12 and an airbag cushion 14 are housed. The inflator discharges fluids which inflate an airbag cushion 14 stored in the housing. The details of the module housing, the inflator and cushion are not set forth as these components are conventional except for the valve in the housing and any of a multitude of presently known designs may be used.

Inflator 12 includes a casing 16 provided with ports 18 through which the gases which are to inflate cushion 14 flow into module housing 10 when foil covering port 18 is ruptured, e.g. as described in the Davis et al. patent.

Figure 2:
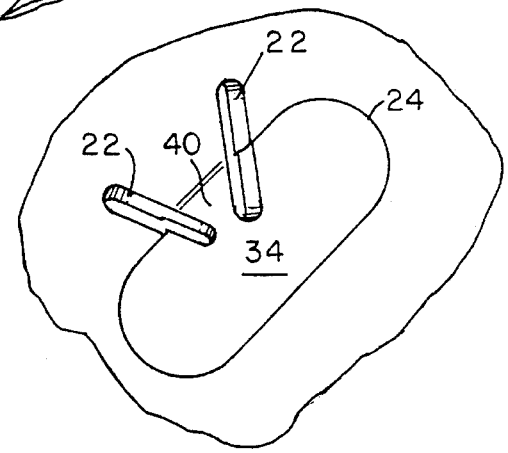
FIG. 2 is an enlarged fragmentary view of one embodiment of the valve means in FIG. 1.
Figure 3:
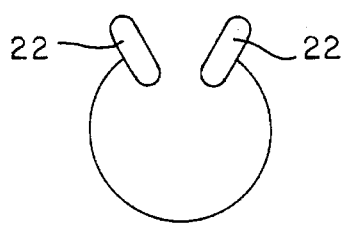
FIGS. 3, 4, 5 and 6 are schematic views of other embodiments of the valve means which may be used.
Figure 4:
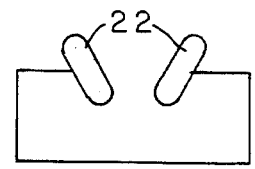
Figure 5:
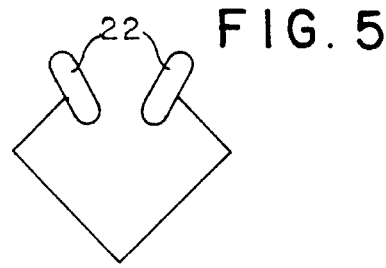

Module housing 10 is also provided with at least one valve 20, shown in greater detail in FIGS. 2, 7 and 8. Valve 20 includes two control slots 22, an oval shaped slug 34 and a connection leg 40.

Figure 6:
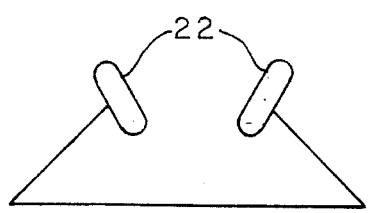

FIGS. 3, 4, 5 and 6 show other embodiments of valve 20 in which the seam defining slug 34 is a circle (FIG. 3), a rectangle (FIG. 4), a square (FIG. 5) and a triangle (FIG. 6). Other polygonal shapes may be used to define the slug portion of valve 20.

THE INVENTION

As indicated above, the invention is a pressure regulating system built into the airbag module housing wall. The invention consists of at least one vent valve 20 punched/formed into the airbag wall using only the parent material. No additional parts or fasteners are required. Each vent valve is strong enough to hold the pressure generated during a normal deployment. The vent valves open during a hot event. Since the vent valve(s) are designed to exhaust gas and to relieve pressure during a hot deployment, the forces and stress on the airbag cushion and module housing are prevented from reaching dangerous and undesired levels.

FIGS. 7 and 8 are top elevations of valve 20. As shown in FIGS. 7 and 7A valve 20 is formed in housing 10 by a punch P and die D. The punch P punches out two control slots 22 and a generally oval shaped seam 24 having a straight side portion 26 opposite the slots 22 and hemicircular ends 28 which terminate in straight extensions 32. A slug 34 defined by seam 24, with side 26, ends 28 and side 32 is offset in an outward direction from the plane of module housing 10 by punch P. Control slots 22 are directed toward one another.

Referring to FIGS. 2, 3, 4, 5 and 6 it will be seen that in all embodiments, the valve consists of a valve connection leg 40, geometry control slots 22 and a slug 34. All valve features can be punched/formed on a flat or curved surface through a conventional punching operation with specially designed tooling. The valve connecting leg 40 functions as a tapered beam having constant stress and strain along its length as it bends. This tapered design prevents fracture as the leg 40 bends. The valve connecting 40 leg controls the opening or "cracking" pressure of the valve through the geometry shown and also depends on the properties of the valve material. The cracking pressure is defined as the pressure required to cause the material to reach its elastic limit. Once the material reaches the elastic limit and moves into plasticity, the valve opens quickly allowing gas to escape. The geometry of the valve connecting leg 40 is important and is defined by the geometry control slots 22 which are narrow slots punched completely through the material. The oval slug 34 makes up the majority of the valve reaction area and is created by punching through the module housing 10 while limiting the punch level. This method frees the slug from the parent material except in the connecting leg area while allowing very little gas leakage along the periphery of the oval slug 34 during ambient deployments.

The module housing material is preferably aluminum or steel having a thickness between 0.5 mm. and 3.0 mm.

The action of the valve is schematically illustrated in FIGS. 8a, and 9a. FIG. 8a shows the valve before the airbag cushion is pressurized and the airbag is inflated, and FIG. 9a shows the valve after it has opened during a hot deployment.

FIG. 8 shows the valve in place before deployment of the airbag. At the time of an impact the pyrotechnic charge is fired and pressure of an inflation gas is applied to the airbag cushion. The same pressure build up takes place inside of module housing 10. If the inflation is normal the pressure does not rise above a preselected value and the valve remains in place as shown in FIG. 8A. If the inflation is "hot", the pressure in the housing and the airbag cushion build up beyond the desired value and threatens to damage the bag or module housing. In this event the valve opens as described above and as shown in FIG. 9A.

It will be seen that the valve remains attached to the airbag module housing during deployment of the airbag, but relieves the pressure in both the airbag cushion and in the module housing.

Having now described the invention it is not intended that it be limited except as required by the appended claims.

We claim:

1. An airbag module housing containing an uninflated airbag stored in said housing, means in said housing to inflate said airbag by gases under pressure and means to relieve excess pressure in said housing, said means comprising a valve located in a wall of said housing and formed entirely of material from said housing, said valve comprising:

a slug having a shape derided by a slit punched in said housing, said slit starting at a first point on said housing and terminating at a second point on said housing, the area between said first point and said second point being unpunched, defining an unpunched valve-connecting leg in said housing, and a pair of slots adjacent to said first point and to said second point, said pair of slots being punched in said housing whereby when the pressure in said housing needs to be relieved during deployment of said bag, said slug bends outwardly from said housing along a hinge formed in said valve-connecting leg between said first point and said second point to create an aperture for the outward flow of gas from within said housing.

2. The invention of claim 1 in which the shaped slit has an oval shape.

3. The invention of claim 1 in which the shaped slit has a circular shape.

4. The invention of claim 1 in which the shaped slit has a polygonal shape.

\* \* \* \* \*

UNITED STATES PATENT AND TRADEMARK OFFICE
CERTIFICATE OF CORRECTION

PATENT NO. : 5,524,925
DATED      : 11 June 1996
INVENTOR(S): Larry D. Rose et al.

It is certified that error appears in the above-indentified patent and that said Letters Patent is hereby corrected as shown below:

At column 4, lines 34, 36 and 38, "the shaped slit" should be --the slit--.

Signed and Sealed this

Twenty-seventh Day of August, 1996

Attest:

BRUCE LEHMAN

Attesting Officer       Commissioner of Patents and Trademarks